(12) United States Patent
Troester (10) Patent No.: US 7,273,433 B1
(45) Date of Patent: Sep. 25, 2007

(54) CONTINUOUSLY VARIABLE TRANSMISSION

(76) Inventor: Thomas F. Troester, 14545 Sedgewick Ct., Granger, IN (US) 46530

( * ) Notice: Subject to any disclaimer, the term of this patent is extended or adjusted under 35 U.S.C. 154(b) by 144 days.

(21) Appl. No.: 11/105,310

(22) Filed: Apr. 13, 2005

Related U.S. Application Data (60) Provisional application No. 60/561,577, filed on Apr. 14, 2004.

(51) Int. Cl.
*F16H 3/50* (2006.01)

(52) U.S. Cl. .......................................... 475/17; 475/344

(58) Field of Classification Search ................... 74/457; 475/16, 306, 17
See application file for complete search history.

(56) References Cited

U.S. PATENT DOCUMENTS 4,680,985 A * 7/1987 Troester ......................... 475/3

5,521,819 A  5/1996 Greenwood
2005/0097977 A1 * 5/2005 Van Cor ...................... 74/462
2007/0050118 A1  3/2007 Murray

OTHER PUBLICATIONS

Web page article titled: "Achieving Geared Neutral" ToroTrak @ www.torotrak.com/IVT/works/epicyclic.htm; date unknown.
SAE Technical Papers Title: Modeling, Simulation & Control Implementation for a Split Torque, Geared-Neutral, Infinitely Variable Transmission; www.sae.org/technical/papers/.

* cited by examiner

*Primary Examiner*—Richard M. Lorence
*Assistant Examiner*—Edwin A Young
(74) *Attorney, Agent, or Firm*—Botkin & Hall, LLP (57) ABSTRACT

A constant mesh gear driven continuously variable transmission including a minimum of two cones in mesh with either an axial sliding ring gear or an axial sliding circular gear. The cones and ring gear or circular gear are enclosed in a housing. An input shaft is journaled in the housing. The cones rotate about their own axes and revolve about the shaft in some embodiments. The ring gear or axial sliding circular gear is slidable axially relative to the cone gear, and the output gear ratio is varied by the axial position on the ring gear or sliding circular gear.

2 Claims, 8 Drawing Sheets

SECTION C-C
FIG. 5

SECTION A-A
FIG. 6

SECTION B-B
FIG. 7

SECTION B-B
FIG. 11

SECTION C-C
FIG. 12

SECTION D-D
FIG. 13

SECTION E-E
FIG. 14

SECTION F-F
FIG. 15

SECTION G-G
FIG. 16

SECTION H-H
FIG. 17

SECTION J-J
FIG. 18

SECTION K-K
FIG. 19

CONTINUOUSLY VARIABLE TRANSMISSION

CROSS-REFERENCE TO RELATED APPLICATION

This application claims the benefit of and is a continuation in part of provisional application Ser. No. 60/561,577, filed Apr. 14, 2004.

BACKGROUND OF THE INVENTION

This invention relates to a transmission having specific application to the automotive industry, but is not intended to be so limited. Other applications are the aerospace industry, or many other applications where speed change devices are desired.

There are many continuously variable transmissions (CVT). Most utilize friction in the drive mechanism and are therefore somewhat limited in torque capacity. The split pair of variable diameter pulleys and belt CVTs (Van Doorne) common in today's automobiles utilizes friction. There are other CVTs that utilize cones, but they use friction as a drive mechanism. This invention as well as U.S. Pat. No. 4,680,985, incorporated herein by reference, utilizes constant mesh gear cones. This invention is novel in the interface and construction of the cones which do not require deflective ring teeth for meshing. The non meshing neutral under cut on the cones is also novel art.

SUMMARY OF THE INVENTION

The continuously variable transmission of this invention includes a housing and an input shaft journaled in the housing. The housing has a ring gear or sliding circular gear which is slidable axially relative to the axis of the shaft. A minimum of two cones having a geared surface is positioned within the housing crank arm and meshes at its geared surface with the sliding ring gear or sliding circular gear as the cone rotates about its axis. One end of the cone is in gear contact with an output gear to cause rotation of the output gear in response to rotation of an input shaft connected to an energy source. The output speed may be varied accordingly to a transmission ratio determined by the axial position of the ring gear or sliding circular gear. The surface of the cone is formed into selectively located non parallel helical teeth for contact with the ring gear or sliding circular gear.

Accordingly, it is an object of this invention to provide a novel and useful continuously variable transmission which produces a gear ration to any theoretical ratio of both forward and reverse outputs rotations with a one direction input rotation.

Another object of this invention is to provide a continuously variable transmission which includes a geared neutral or zero ratio while still in gear mesh.

Another object of this invention is to provide a continuously variable transmission which includes a cone having a specific gear surface.

Another object of this invention is to provide a continuously variable transmission which includes a housing having an input shaft journaled in the housing and a minimum of two cones which rotate about the axis of the shaft.

Another object of this invention is to provide cones as previously described with an under cut at the theoretical geared neutral to limit the theoretical infinite torque at either side of neutral. Other objects of this invention will become apparent upon a reading of the following description.

DESCRIPTION OF THE PREFERRED EMBODIMENTS

The preferred embodiments illustrated are not intended to be exhaustive or to limit the invention to the precise forms disclosed. They are chosen and described in order to explain the principles of the invention and its application and practical use to thereby enable others skilled in the art to use the invention.

Figure 1:
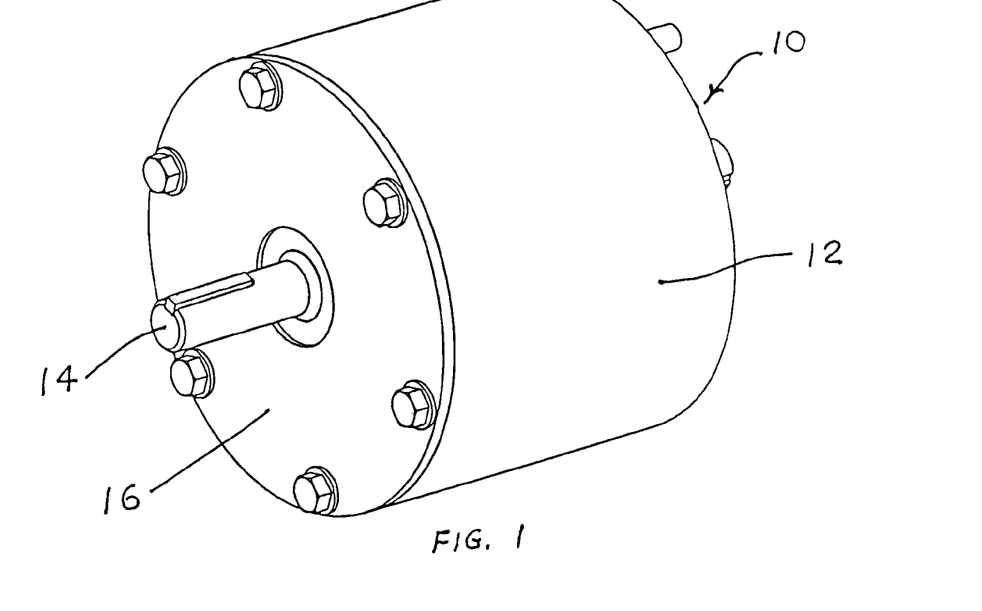
FIG. 1 is a perspective view of the transmission facing the output shaft.

An embodiment of the continuously variable transmission 10 is shown in FIG. 1. Transmission 10 includes housing 12 and output shaft 14 journaled by bearings 44 which are preferable of the sealed ball type and mounted in the housing cover 16. An input shaft 18 is journaled at one side by bearings 20 which are preferable of the sealed ball type and are mounted in housing 12. Input shaft 18 is journaled at one end in the body of output shaft 14 by bearings 22 which are preferable of the needle roller type. A first pair of arms 24 extends radially outward from input shaft 18 and are angled transversely to the axis of the input shaft. Arms 24 are oppositely spaced upon the input shaft 18. Input shaft 18 also includes a flange member 26 having openings 28 formed in the flange and spaced radially about the input shaft. Arms 46 project from input shaft 18 and are attached to flange 26 with bolts 50, or similar fastening devices, threaded into openings 28. Arms 46 are radially oppositely spaced about input shaft 18. Each arm 46 has an opening 32 formed therein and which aligned with a similar opening 62 in each arm 24.

Figure 2:
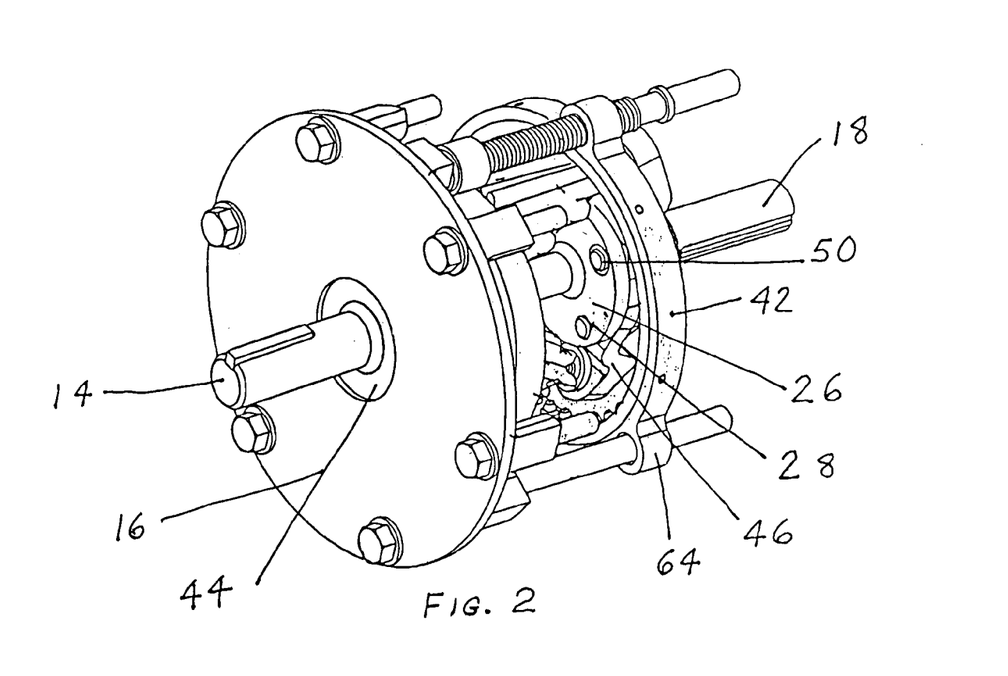
FIG. 2 is a perspective view of the transmission facing the output shaft with the housing removed for purposes of illustration.
Figure 3:
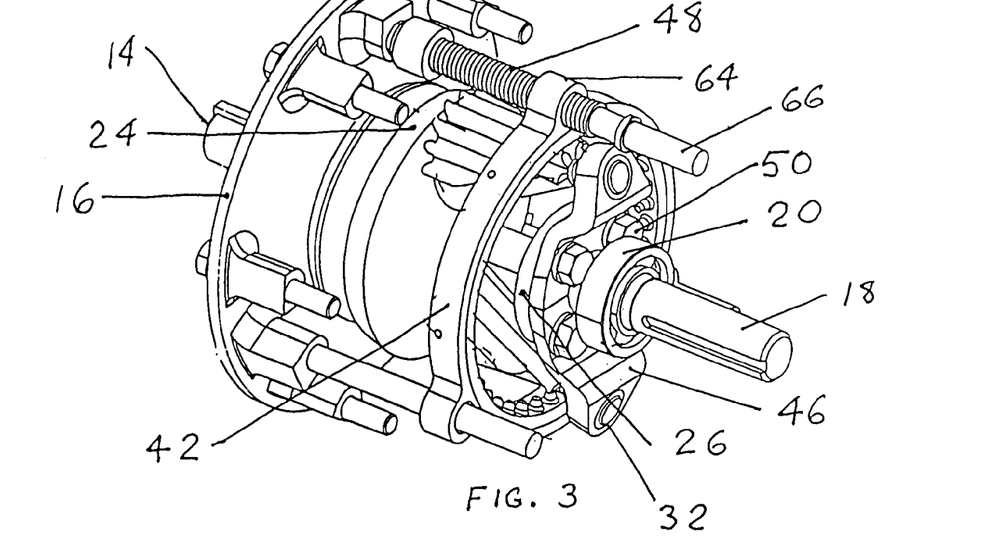
FIG. 3 is a perspective view of the transmission facing the input shaft with the housing removed for purposes of illustration.
Figure 4:
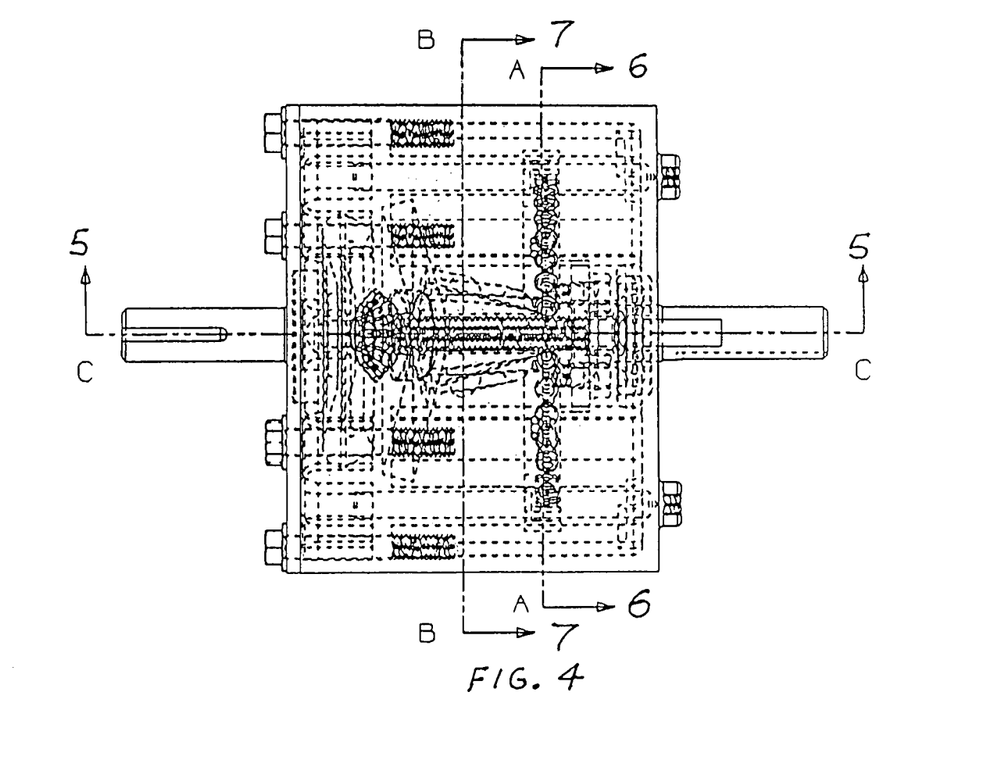
FIG. 4 is a side view of the transmission with the output shaft on the left and the input shaft on the right and shows the cut lines for sectional views of FIG. 5, FIG. 6, and FIG. 7.
Figure 5:
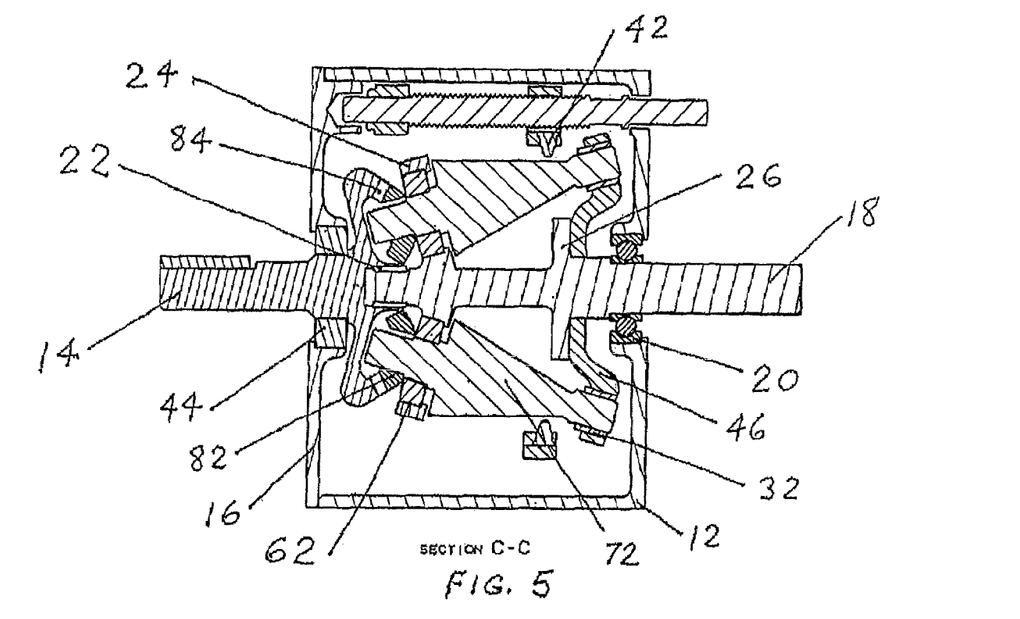
FIG. 5 is a sectional view taken along line 5-5 of FIG. 4.

A ring gear 42 is mounted in housing 12, as shown in FIG. 2. Rotation of ring gear 42 is prevented by one or more tabs 64 which are axially moveable to one or more shafts 66. Shafts 66 are mounted in housing 12 and housing cover 16 and tabs 64 slide axially on bearings 34. One or more of the shafts 66 are provided with axially adjustment means, preferable external screw threads 48. Two or more partial geared cones 72 are mounted in openings 62 and 32 and supported by anti friction bearings. Bevel gears 82 are attached with anti rotational means to cones 72. Bevel gears 82 mesh with ring gear 84 which are formed on or attached to output shaft 14. Cones 72 have less than half of their outer conical surface covered with non parallel helical teeth 74 with the same circular gear pitch 78 as ring gear 42. The conical surface of cones 72 not covered by teeth 76 are under cut or have a diameter less than teeth 74 root diameter. Rotation of input shaft 18 causes a cone 72 and bevel gear 82 to rotate. Bevel gear 82 meshes with output ring gear 84 to cause rotation of the output shaft 14. It should be understood that an input source may be connected to shaft 14 thus converting shaft 18 to an output shaft. The ratio of speed of rotation of input shaft 18 to output shaft 14 is varied by shifting ring gear 42 axially relative to shaft 66. The ratio is variable through a zero ratio or neutral to any theoretical ratio, including reverse rotation.

Figure 6:
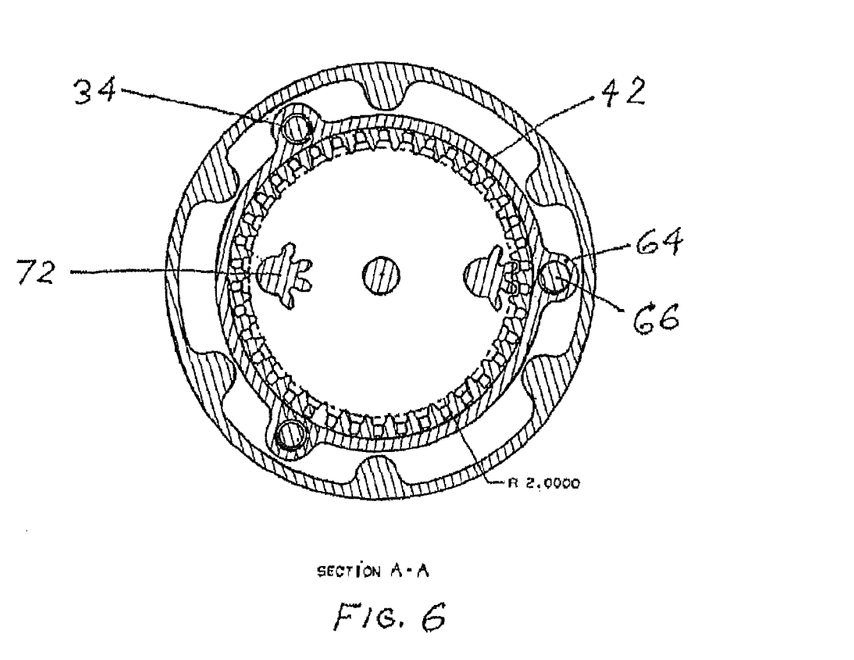
FIG. 6 is a sectional view taken along line 6-6 of FIG. 4.
Figure 7:
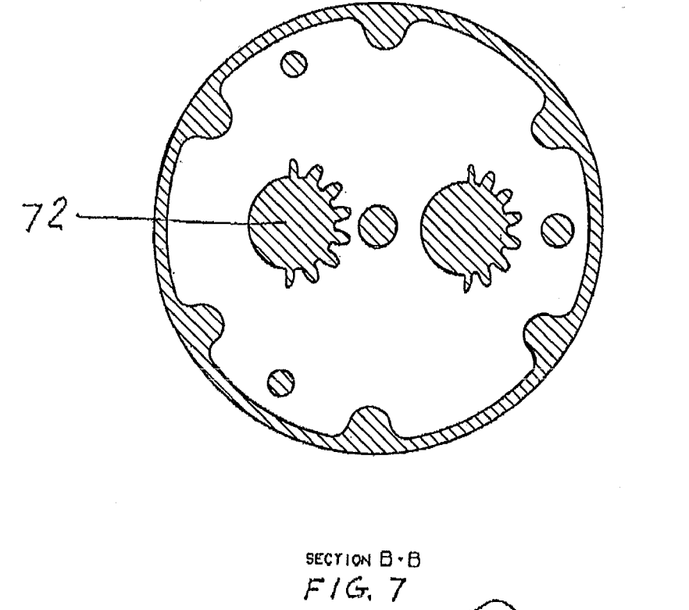
FIG. 7 is a sectional view taken along line 7-7 of FIG. 4.
Figure 8:
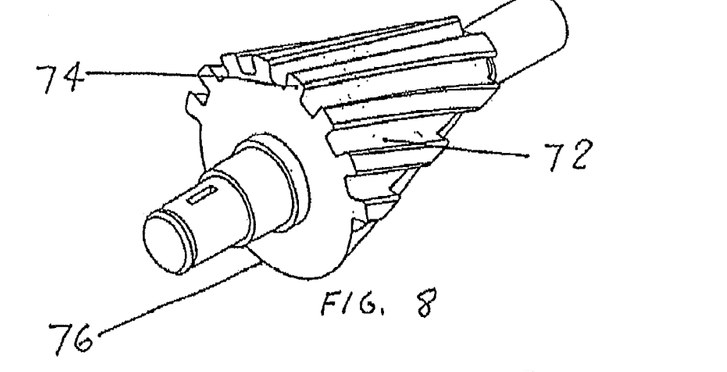
FIG. 8 is a perspective view of a cone.

In FIGS. 6-8, 10-19 a preferred embodiment of each gear cone 72 is shown. Each cone 72 has a right circular conical surface upon which are formed non parallel helical teeth 74. The pitch of teeth 74 are on a circular pitch line relative to the axis of rotation of cone 72 and perpendicular to the axis of cone 72. Each cone 72 has partial teeth coverage, as seen in FIG. 8, and only one cone at a time is in mesh with ring gear 42, as seen in FIG. 6. At ring gear 42 adjustments locations relative to cone 72 where the circular pitch of cone 72 is an integral of ring gear 42 pitch diameter the transfer of meshing from one cone 72 to other cone 72 is done as in normal gear trains. For ring gear 42 adjustments not meeting the above criteria the transfer or meshing is accomplished by the partial teeth coverage of each cone 72 whereby the first cone 72 releases contact with the ring gear before the second cone 72 engages ring gear 42. During this short time and displacement the cones 72 are unloaded other than inertial loads and are carried by the input shaft 18 and move relative to the ring gear 42 while still in mesh with and traveling around output ring gear 84. This allows the leading edge of the toothed section of the second cone 72 to engage the next tooth of ring gear 42.

Figure 9:
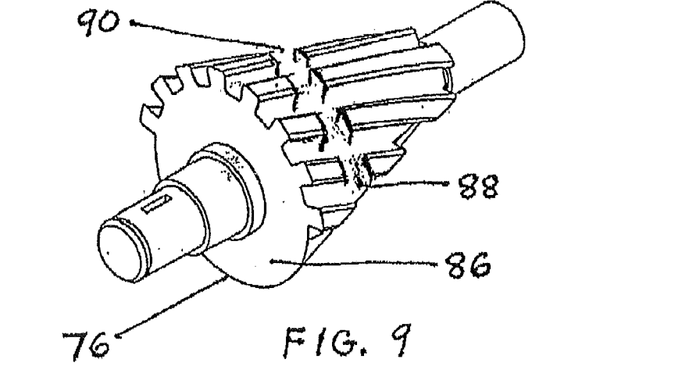
FIG. 9 is a perspective view of an alternative cone design.
Figure 10:
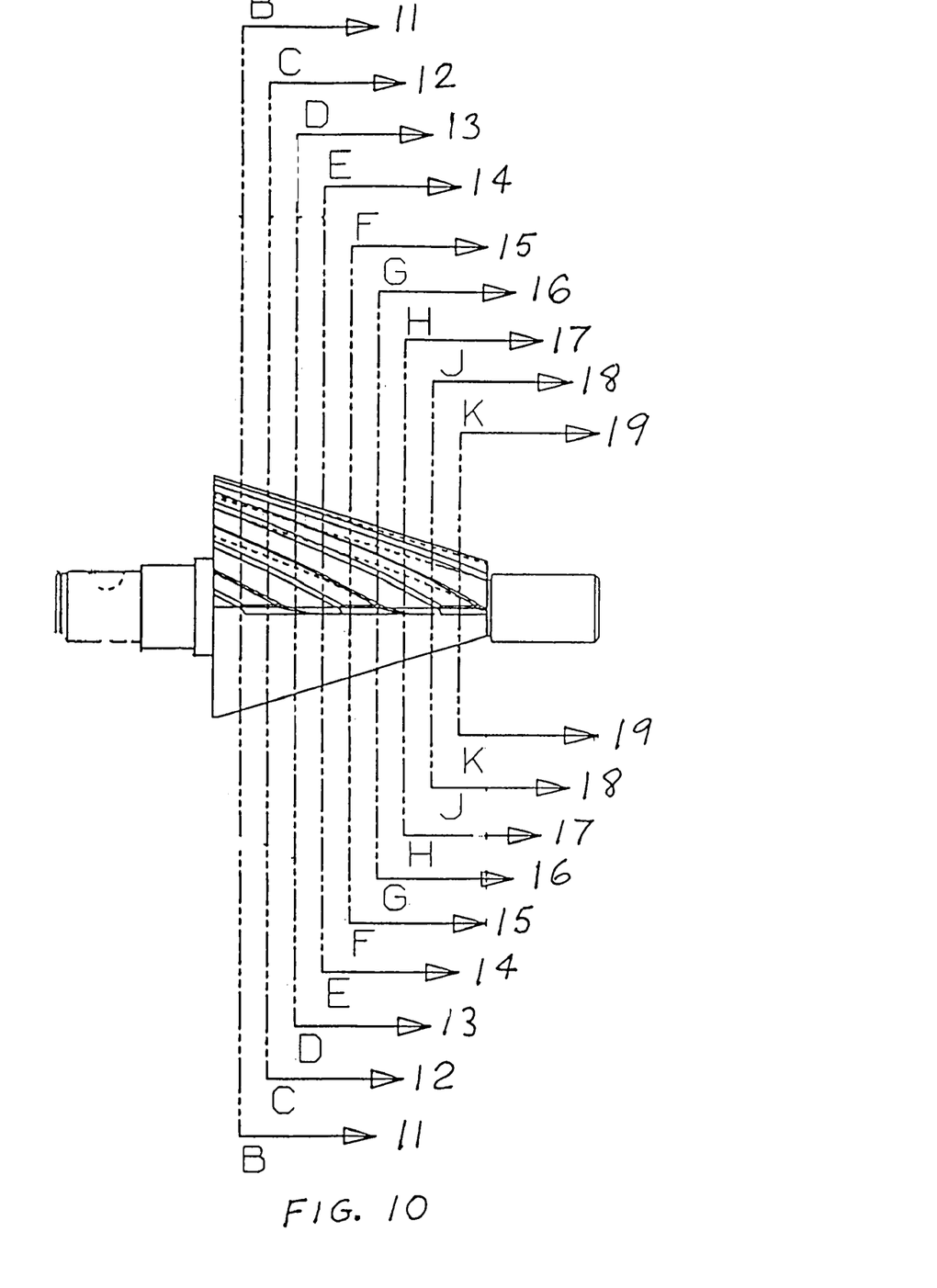
FIG. 10 is a side view of a cone and shows the viewing lines for FIG. 11, FIG. 12, FIG. 13, FIG. 14, FIG. 15, FIG. 16, FIG. 17, FIG. 18, and FIG. 19.
Figure 11:
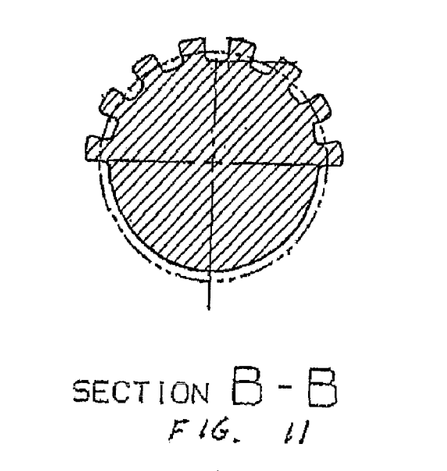
FIG. 11 is a sectional view taken along line 11-11 of FIG. 10.
Figure 12:
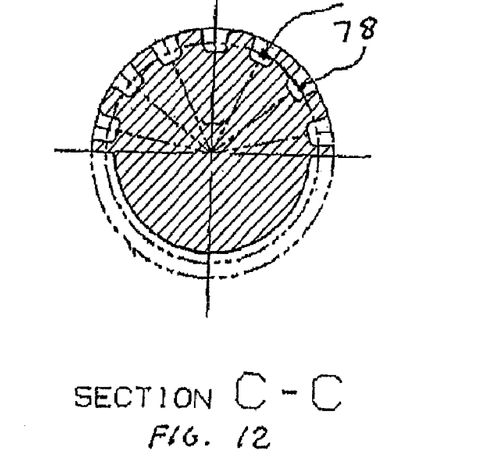
FIG. 12 is a sectional view taken along line 12-12 of FIG. 10.
Figure 13:
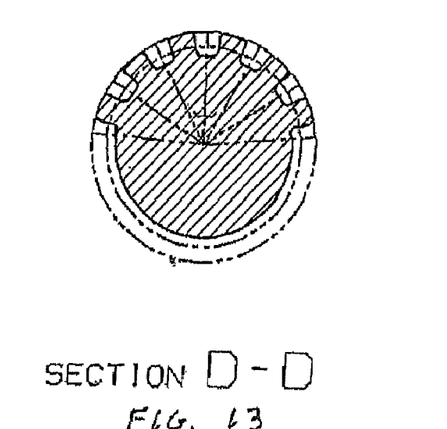
FIG. 13 is a sectional view taken along line 13-13 of FIG. 10.
Figure 14:
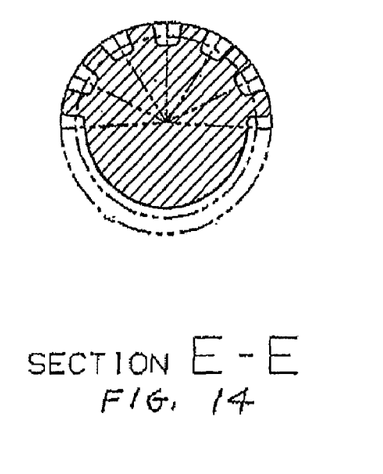
FIG. 14 is a sectional view taken along line 14-14 of FIG. 10.
Figure 15:
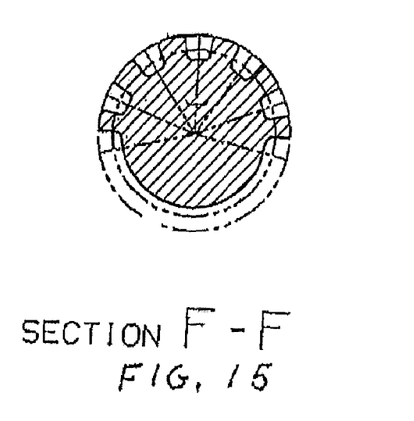
FIG. 15 is a sectional view taken along line 15-15 of FIG. 10.
Figure 16:
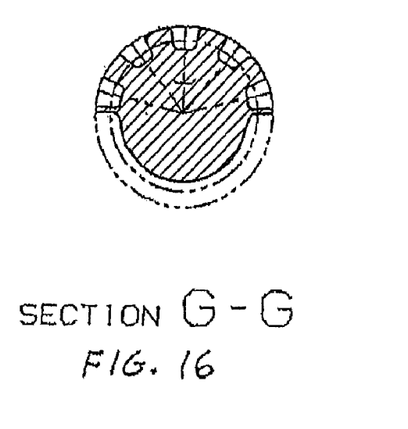
FIG. 16 is a sectional view taken along line 16-16 of FIG. 10.
Figure 17:
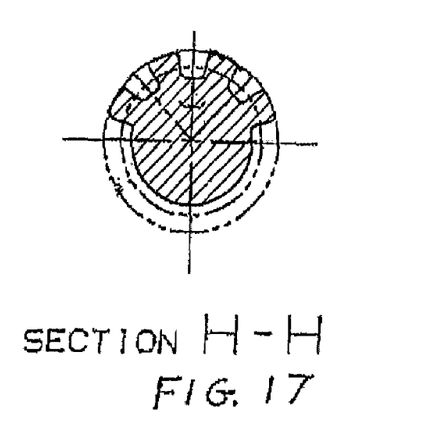
FIG. 17 is a sectional view taken along line 17-17 of FIG. 10.
Figure 18:
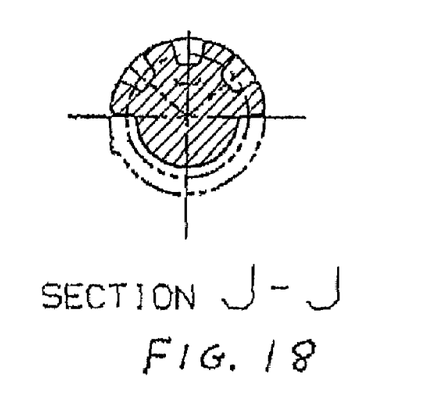
FIG. 18 is a sectional view taken along line 18-18 of FIG. 10.
Figure 19:
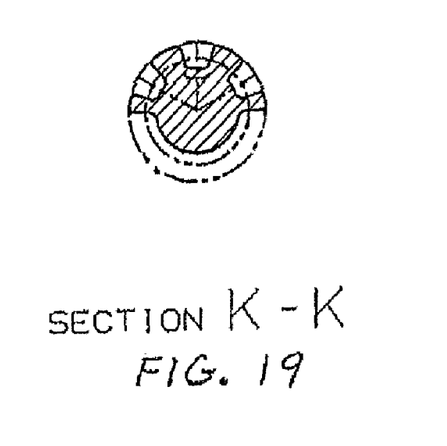
FIG. 19 is a sectional view taken along line 19-19 of FIG. 10.

An alternate embodiment of continuously variable transmission 10 shown in FIG. 1 includes cone 86 shown in FIG. 9. Some of the possible combinations of gear diameters, cone diameters, and cranks arms radii used in continuously transmission 10 shown in FIG. 1 yield a geared neutral condition. This condition occurs when the input rotation of input shaft 18 carrying the cones 72 or alternate cone 86 through crank arms 46, and the counter rotation of cones 72 or alternate cones 86, both acting on output ring gear 84 in opposite direction of rotation are equal. The adjustment of ring gear 42 relative to cones 72 or alternate cones 86 just before a geared neutral equates to a very low rotational speed of output shaft 14 changes direction of rotation and its rotational speed is very low and therefore a very high torque. The undercut 88 of cone 86 shown in FIG. 9 is constructed to tailor the very high torque and location of the geared neutral. The undercut 88, with width 90 and depth 76, allows for an adjustment where there is no gear mesh.

It is to be understood that the invention is not to be limited by the terms of the above description but may be modified within the scope of the appended claims.

I claim:

1. A continuously variable transmission comprising an epicyclic cone in mesh with an axially slidable non-rotatable ring gear, said transmission including a housing, a first shaft and a second shaft each journaled in said housing, the ring gear having teeth and being mounted in said housing, means for shifting said ring gear axially relative to said first shaft, said second shaft including a first gear, a plurality of gear cones, each cone including pitch lines and having an outer right circular conical surface and including teeth thereon within said pitch lines of the cone and adapted to mesh with said ring gear teeth, each cone including a part in mesh with said first gear, said gear cones being rotatably carried by said first shaft and equally angularly positioned about the axis of rotation of said first shaft whereby rotation of one of said first and second shafts causes rotation of the gear cones relative to the ring gear and resulting rotation of the other of said first and second shafts, said ring gear being shiftable axially to vary the ratio of rotation of said first and second shafts, each cone conical surface having formed thereon non parallel helical teeth on a circular pitch line relative to the cone's axis, the pitch of said teeth being on a circular pitch line relative to the axis of rotation of the cones and perpendicular to the axis of cones, each gear cone having partial teeth and interrupted meshing coverage with said ring gear to other of said cones when the pitch of said ring gear is not an integral of the diameter of said gear cone at the particular axial adjustment of said ring gear.

2. A continuously variable transmission of claim 1 wherein the cones have an undercut to the area covered by teeth on a circular line around the cones axis and centered at the theoretical neutral of the transmission, the diameter of the undercut to be equal or less than the teeth root diameter at said theoretical neutral and the width to be greater than the ring gear tooth width.

* * * * *